Sept. 5, 1939. P. G. ROSE 2,172,177
FRAME AND WHEEL AXLE OF MOTOR AND OTHER VEHICLES
Filed Dec. 3, 1937 3 Sheets-Sheet 1

WITNESSES

INVENTOR
PERCY GEORGE ROSE
BY Richards & Geier
ATTORNEYS

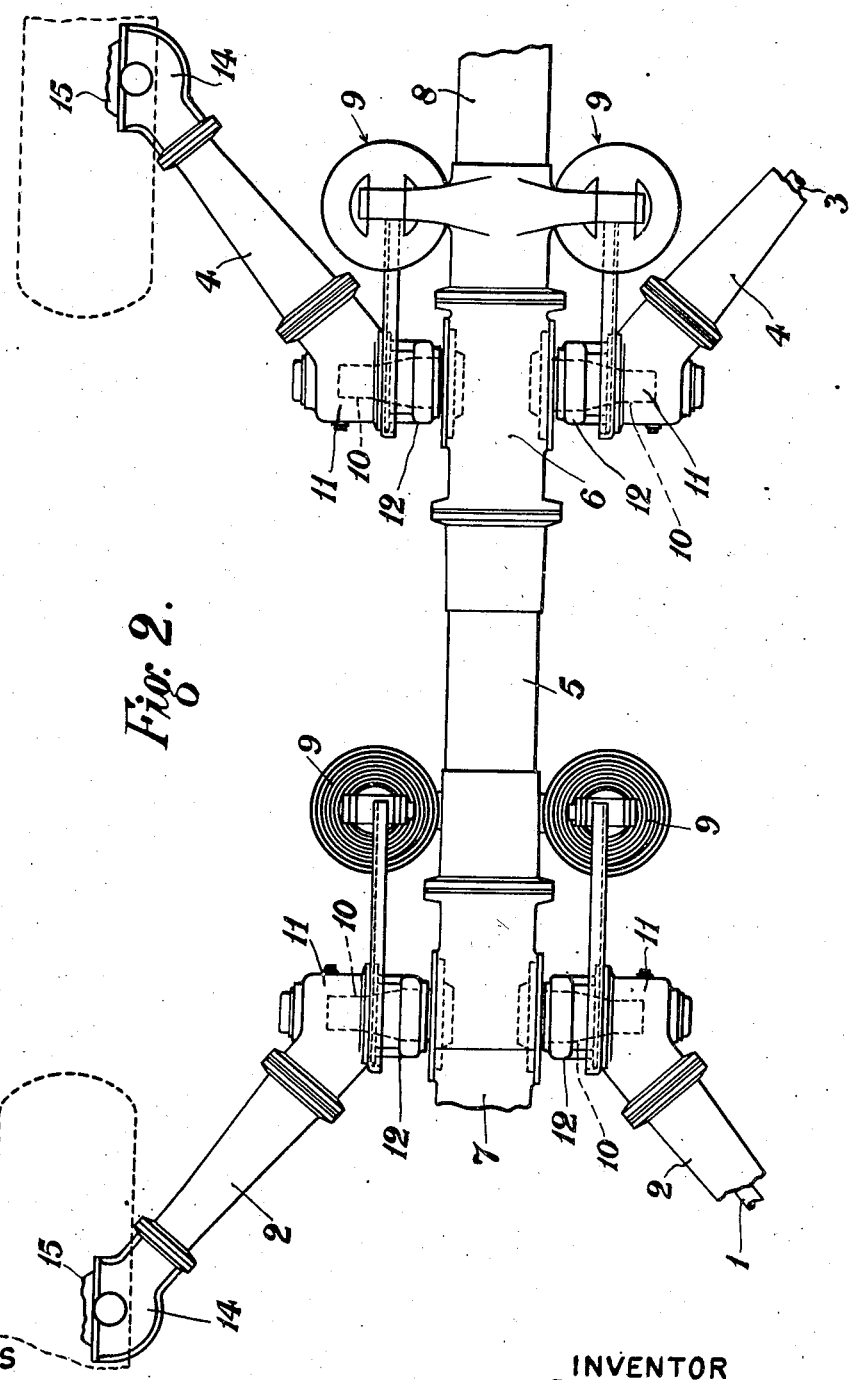

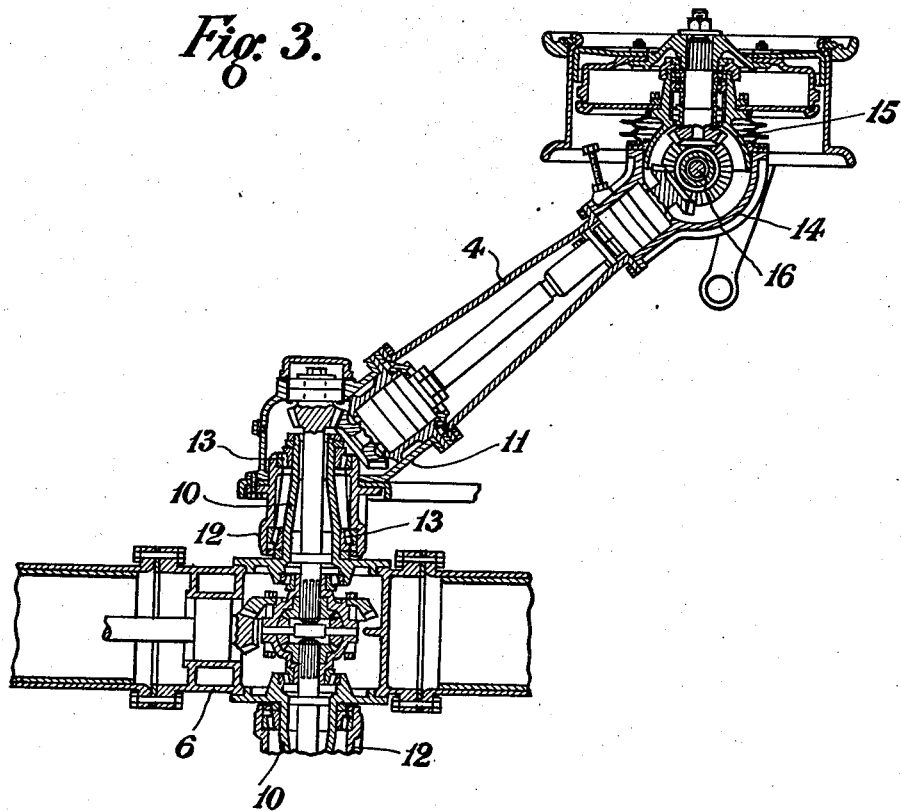

Patented Sept. 5, 1939

2,172,177

UNITED STATES PATENT OFFICE 2,172,177

FRAME AND WHEEL AXLE OF MOTOR AND OTHER VEHICLES

Percy George Rose, Birmingham, England, assignor to Morris Commercial Cars Limited, Birmingham, England Application December 3, 1937, Serial No. 177,887 In Great Britain April 13, 1937

6 Claims. (Cl. 180—45)

This invention relates to vehicles generally, but has more particular reference to motor vehicles and to trailers for use in connection therewith. The object of the invention is to provide a vehicle of an improved and novel construction.

According to the invention a vehicle is provided with road wheels having axle shafts or half-axles, or axle casings, pivotally or swivelly connected to a longitudinal median member, the said axle shaft or half-axles, or axle casings, being capable of moving or swinging angularly in vertical planes and being inclined or obliquely disposed in plan relatively to the said median member and extending from opposite sides of the latter. In most instances four-wheeled vehicles would be provided with two pairs of diverging axle shafts or half-axles, or axle-casings, swivelly or pivotally connected to the central frame or median member, those for the front wheels extending in a forward direction and those for the rear wheels extending in a rearward direction. In some cases, such as for example, with some kinds of trailers, a single pair of swinging axle shafts or axle casings may be provided attached to the central frame or median member as stated. A single median member of a hollow or tubular construction may be provided, with tubular axle casings swivelly connected thereto, each axle casing terminating at its inner end in a sleeve engaging over a lateral trunnion on the median member, the said trunnion being disposed at right-angles to the axis of the latter.

This application is a continuation-in-part of my copending application Serial No. 162,107, filed Sept. 2, 1937.

Figure 1 of the accompanying drawings represents a side view of a motor vehicle chassis comprising a single median member, with obliquely arranged swinging wheel axle casings swivelly connected thereto in accordance with this invention.

Figure 2 is a plan view of the same, the swivelling axle casings at the one side being broken away.

Figure 3 represents a horizontal section through one of the wheel axle casings upon a larger scale.

Figure 1:
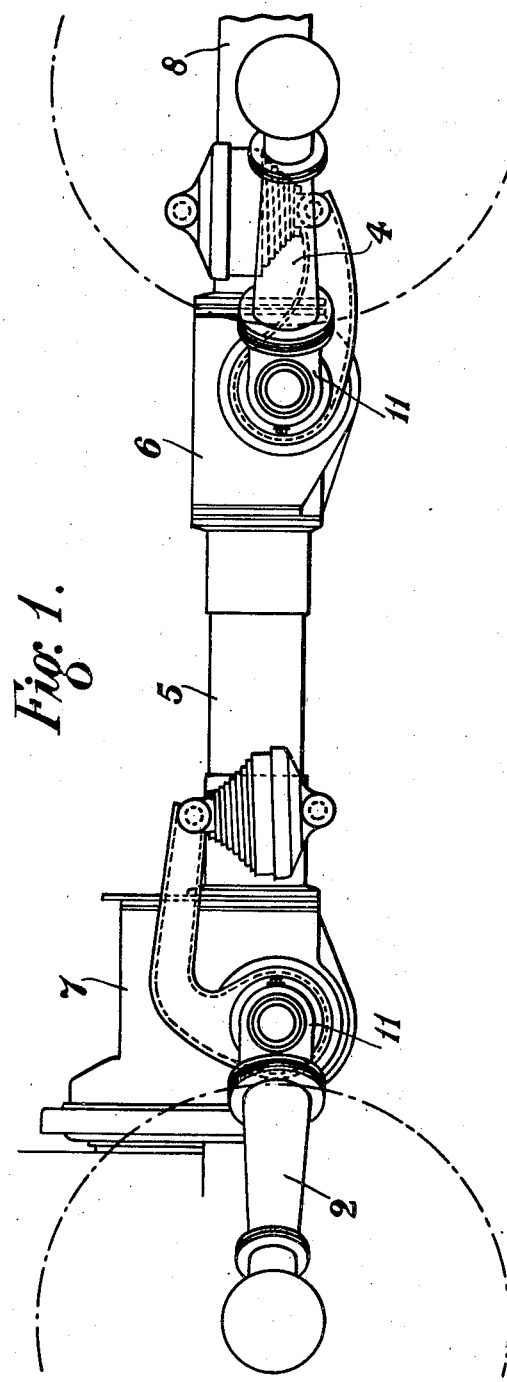

Referring to the drawings, all four wheels of the vehicle are adapted to be driven, each wheel being provided with a separate axle shaft or half-axle, the axle shafts 1 of the two front wheels being inclined relatively to one another and being enclosed within separate tapering tubular casings 2, and the axle shafts 3 of the two rear wheels being relatively inclined a similar amount and being enclosed within separate tubular casings 4. Each axle shaft or half-axle is gear driven and operates the respective road wheel, whilst the frame or chassis of the vehicle consists of a single longitudinal median member disposed in the central plane of the vehicle. This median member is of a composite construction and comprises a central tubular part 5, through which the transmission shaft passes, the said tubular part 5 being fixed at its rear end to a housing 6 containing rear differential gearing, and being connected at its forward end to a casing 7 housing front differential gearing and also variable speed mechanism, through which the drive from the engine may be transmitted. A tubular rear extension 8 is provided at the outer end of the rear differential housing 6, the parts 5, 6, 7 and 8 together forming a rigid median member of a hollow rigid construction. The casings 2 and 4 housing the separate axle shafts or half-axles are arranged obliquely relatively to this central median member and extend at equal angles from opposite sides of the latter, the casings 2 of the front axle shafts 1 extending forwardly and the casings 4 of the rear axle shafts 3 extending in a rearward direction, the two pairs of axle casings diverging as illustrated in Figure 2. The wheel axle casings 2 and 4 are swivelly or pivotally connected to the median member which thus constitutes the frame of the vehicle, so that they may swing or move angularly, under load variations, in vertical planes against the action of suitably disposed springs, such as the springs 9. In order swivelly to connect the axle casings 2 and 4 the gear housings 6 and 7 are provided at each side with a rigid tubular extension or hollow trunnion 10, as shown in Figure 3, and fixed to the inner end of each wheel axle casing 2 or 4 is a box-like part 11 to which is attached a short sleeve 12 which fits over, and is concentric with, the respective side extension or trunnion 10 of the median member. Two sets of roller bearings 13 are interposed between the trunnions or side extensions 10 and the sleeves 12 at the inner ends of the wheel axle casings, so that the latter may thus turn about the trunnions 10 which are set at right-angles to the axis of the median member. The outer end of each swinging wheel axle casings 2 or 4 is fitted with an extension 14 terminating in a hollow part-spherical portion, the latter engaging over an inner part-spherical portion 15 supported by the respective wheel of the vehicle, the engaging or co-operating parts being connected together by a pin or bolt 16 which permits of the necessary relative angular movement of the wheel for steering, the wheel turning relatively to the part 15.

When the vehicle is in use the half-axles or axle-shafts and the respective axle casings 2 or 4 may move or swing independently about the trunnions or side extensions 10 of the median member, under varying road conditions to the extent permitted by the springs, whilst since a single median member only is provided instead of a frame of conventional form the construction of the vehicle is considerably simplified and lightened without loss of strength. The median member may carry cross-bars or the like of any suitable form for the attachment of the body of the vehicle.

The invention may, of course, be applied to vehicles in which two wheels only are driven; or to trailers having either two or four wheels, the axle shafts, or wheel axle casings, being inclined or obliquely disposed relatively to a median member in the same way.

Where the road wheels are not driven the axle casings may be dispensed with and the axle shafts themselves may be swively or hingedly connected to the median member.

Having fully described my invention, what I desire to claim and secure by Letters Patent is:

1. A vehicle comprising a hollow median member, front and rear pairs of lateral trunnions on the median member at right-angles to the axis of the latter, hollow axle casings swively mounted on the front and rear trunnions so as to be capable of moving in vertical planes, the said axle casings being obliquely disposed in plan relatively to the median member, those mounted on the front trunnions diverging in a forward direction and those mounted on the rear trunnions diverging in a rearward direction, road wheels, part-spherical parts on the road wheels and part-spherical parts on the outer ends of the axle casings engaging over the part-spherical parts on the road wheels.

2. A vehicle having a longitudinal median member comprising a front gear housing, a rear gear housing, a tubular shaft connecting the front and rear gear housings and lateral trunnions on the front and rear gear housings at right-angles to the axis of the median member, in combination with hollow axle casings, sleeve like extensions on the axle casings swively mounted on the trunnions, so that the axle casings may swing in vertical planes, the said axle casings being inclined in plan relatively to the axis of the median member, those mounted on the trunnions of the front gear housing diverging in a forward direction and those mounted on the trunnions of the rear gear housing diverging in a rearward direction, road wheels, co-operating part-spherical portions on the road wheels and on the outer ends of the axle casings, and means for pivotally connecting the co-operating part-spherical portions together.

3. A motor vehicle having a main driving shaft, auxiliary shafts projecting from opposite sides of the main driving shaft and driven by the latter, two forwardly-extending diverging axle shafts and two rearwardly-extending diverging axle shafts, said axle shafts being driven from the auxiliary shafts and disposed in plan obliquely to the axis of the main driving shaft, a longitudinal tubular median frame member housing the driving shaft, lateral sleeves projecting from and supported solely by the tubular median member, the said sleeves surrounding and supporting the auxiliary shafts, casings surrounding the axle shafts and rotatably mounted on the lateral sleeves so as to be capable of swinging in substantially vertical planes, and co-operating gear elements on the auxiliary shafts and axle shafts for driving the latter, the gear elements allowing the axle shafts to swing with the axle casings by a relative rolling action.

4. A motor vehicle having a main driving shaft, auxiliary shafts projecting from opposite sides of the main driving shaft and driven by the latter, two forwardly-extending diverging axle shafts and two rearwardly-extending diverging axle shafts, said axle shafts being driven from the auxiliary shafts and disposed in plan obliquely to the axis of the main driving shaft, a single median frame member surrounding and entirely enclosing the driving shaft, lateral tubular trunnions fixed to and supported solely by the median frame member, the said trunnions surrounding and supporting the auxiliary shafts, casings surrounding and enclosing the axle shafts, extensions on the axle shaft casings enclosing the auxiliary shafts and the lateral trunnions on the median member, the said casing extensions being rotatably mounted on the lateral trunnions to permit of the axle casings swinging in substantially vertical planes, co-operating gear elements on the auxiliary shafts and axle shafts for driving the latter, the gear elements allowing, by a relative rolling action, of the axle shafts swinging with the axle casings; road wheels, shafts fixed to the road wheels, gearing operatively connecting the axle shafts to the road wheel shafts, sleeves surrounding the road wheel shafts, part-spherical extensions on the sleeves, part-spherical extensions on the axle casings engaging the part-spherical extensions of the sleeves, and pins swively connecting together the engaging part-spherical extensions.

5. A motor vehicle having a main driving shaft, auxiliary shafts projecting from opposite sides of the main driving shaft and driven by the latter, two forwardly-extending diverging axle shafts and two rearwardly-extending diverging axle shafts, said axle shafts being driven from the auxiliary shafts and disposed in plan obliquely to the axis of the main driving shaft, a longitudinal tubular median frame member housing the driving shaft, hollow trunnions fixed to and projecting laterally from opposite sides of the tubular median member, the said trunnions supporting and surrounding the auxiliary shafts, casings surrounding the axle shafts, hollow angular extensions on the axle shaft casings rotatably mounted on the trunnions, so that the axle shaft casings may swing in substantially vertical planes, and co-operating gear elements on the auxiliary shafts and axle shafts for driving the latter, the gear elements allowing the axle shafts to swing with the axle casings by a relative rolling action and being entirely enclosed by the extensions of the axle shaft casings.

6. A motor vehicle having a main driving shaft, auxiliary shafts projecting from opposite sides of the main driving shaft, differential gearing forming a driving connection between the driving shaft and the auxiliary shafts, two forwardly-extending diverging axle shafts and two rearwardly-extending diverging axle shafts, said axle shafts being driven from the auxiliary shafts and disposed in plan obliquely to the axis of the main driving shaft, a single longitudinal tubular median frame member housing the driving shaft, lateral sleeves projecting from and supported solely by the tubular median member, the said sleeves surrounding and supporting the auxiliary shafts, casings surrounding the axle shafts and rotatably mounted on the lateral sleeves so as to be capable of swinging in substantially vertical planes, and co-operating gear elements on the auxiliary shafts and axle shafts for driving the latter, the gear elements allowing the axle shafts to swing with the axle casings by a relative rolling action.

PERCY GEORGE ROSE.